United States Patent [19]
Thompson

[11] 3,851,567
[45] Dec. 3, 1974

[54] BRAKE MECHANISM

[76] Inventor: Tom H. Thompson, 29210 Point O'Woods Pl., Southfield, Mich. 48075

[22] Filed: Mar. 30, 1970

[21] Appl. No.: 23,699

Related U.S. Application Data

[63] Continuation-in-part of Ser. No. 7,381, Feb. 3, 1970, abandoned, which is a continuation of Ser. No. 692,218, Dec. 20, 1967, abandoned.

[52] U.S. Cl............................ 92/42, 60/533, 92/34, 92/47, 188/71.8, 188/370
[51] Int. Cl............................................... F16j 3/00
[58] Field of Search ........... 92/34, 101, 104, 42, 98, 92/92, 91, 44, 47, 103 S, 103 M, 103, 45, 46; 74/18, 18.1, 18.2; 116/114; 73/410; 60/54.55, 54.5 M; 188/71.8, 370, 196 R

[56] References Cited
UNITED STATES PATENTS

| | | | |
|---|---|---|---|
| 1,018,412 | 2/1912 | Diesel............................. | 60/54.6 M |
| 1,094,323 | 4/1914 | Fulton.................................... | 92/34 |
| 1,368,253 | 2/1921 | Fulton.................................... | 92/47 |
| 2,333,401 | 11/1943 | Woods.................................. | 73/410 |
| 2,371,554 | 3/1945 | Scott-Iversen................... | 60/54.6 M |
| 2,520,386 | 8/1950 | Dillman........................... | 92/103 X |
| 2,789,580 | 4/1957 | Woods................................... | 92/47 |
| 2,955,579 | 10/1960 | Block............................. | 92/165 RR |
| 3,131,565 | 5/1964 | Amlie............................. | 92/103 M |
| 3,213,764 | 10/1965 | Nelson.................................. | 92/41 |
| 3,324,895 | 6/1967 | Johnson........................... | 92/47 X |
| 3,397,621 | 8/1968 | Groves............................ | 92/103 X |
| 3,403,754 | 10/1968 | Barrett et al..................... | 188/71.5 |
| 3,517,782 | 6/1970 | Hayes.............................. | 92/165 X |

FOREIGN PATENTS OR APPLICATIONS

115,964   5/1918   Great Britain.......................... 92/47

*Primary Examiner*—Irwin C. Cohen
*Attorney, Agent, or Firm*—Reising, Ethington & Perry

[57] ABSTRACT

Hydraulic brake apparatus including an actuator having a pair of spaced end portions, an endless sidewall extending between the end portions, and at least one inelastically deformable corrugation formed in the side wall that tends to flatten out inelastically when the actuator is forced to extend and thus increase the space between the end portions, the inelastic deformation of the corrugation preventing the actuator from rebounding elastically to its original length when the extending force is removed.

16 Claims, 52 Drawing Figures

INVENTOR.
Tom H. Thompson
BY
Barnard, McGlynn & Reising
ATTORNEYS

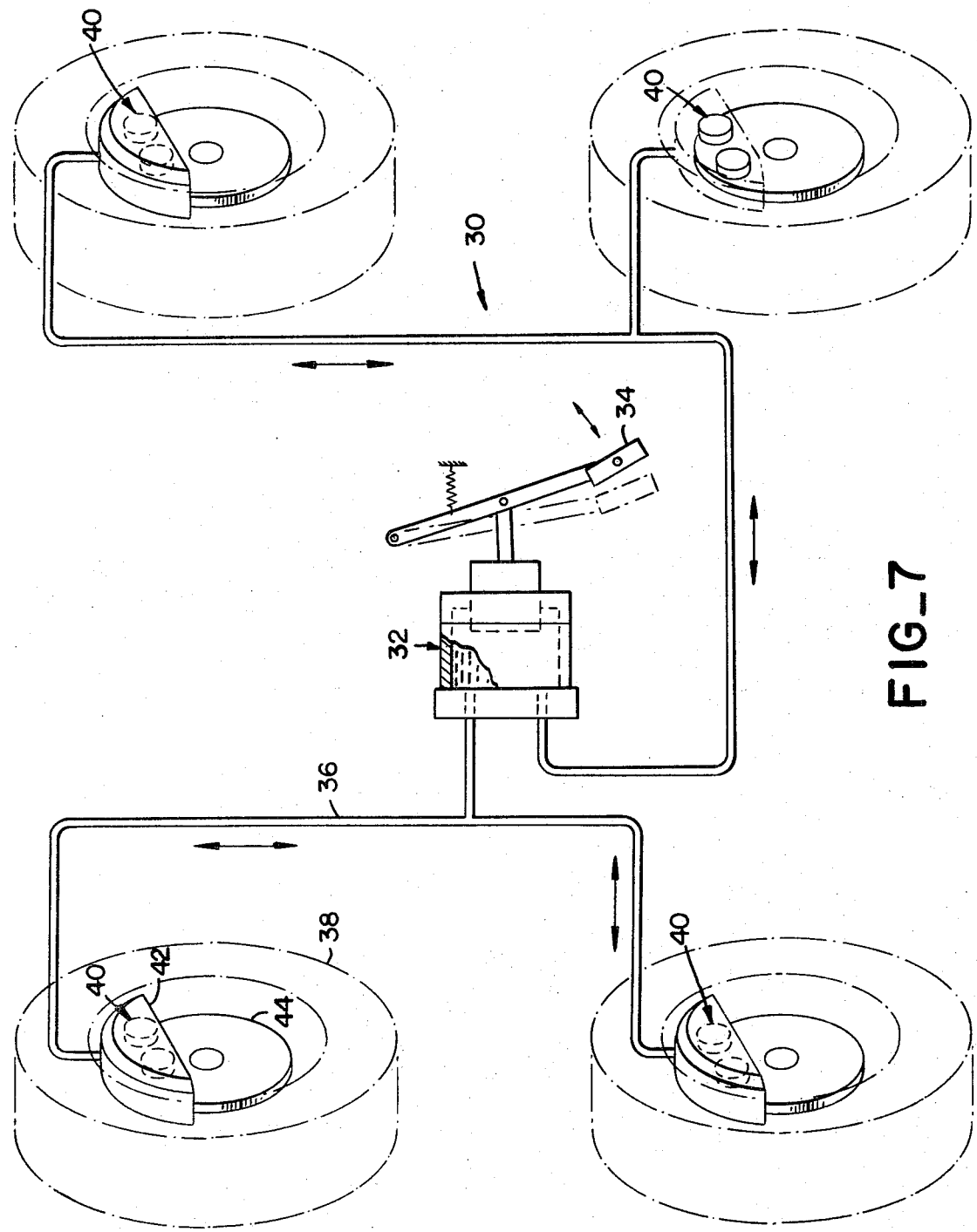

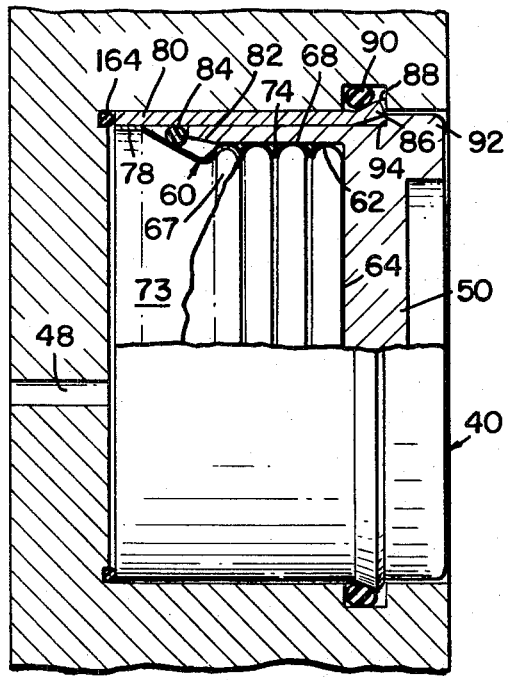
FIG_9
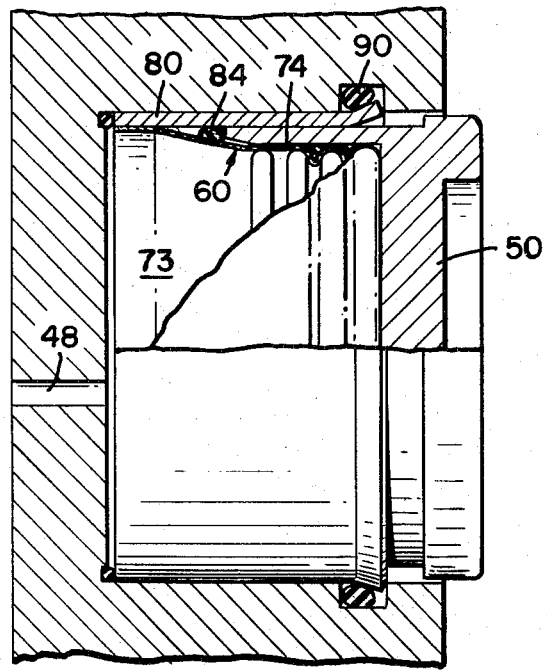
FIG_10
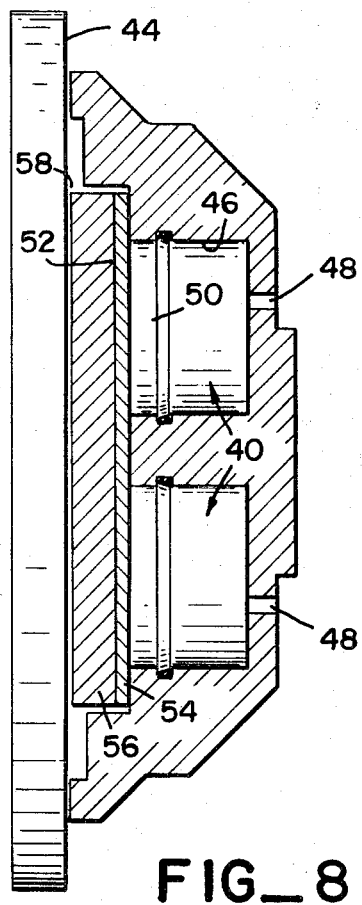
FIG_8
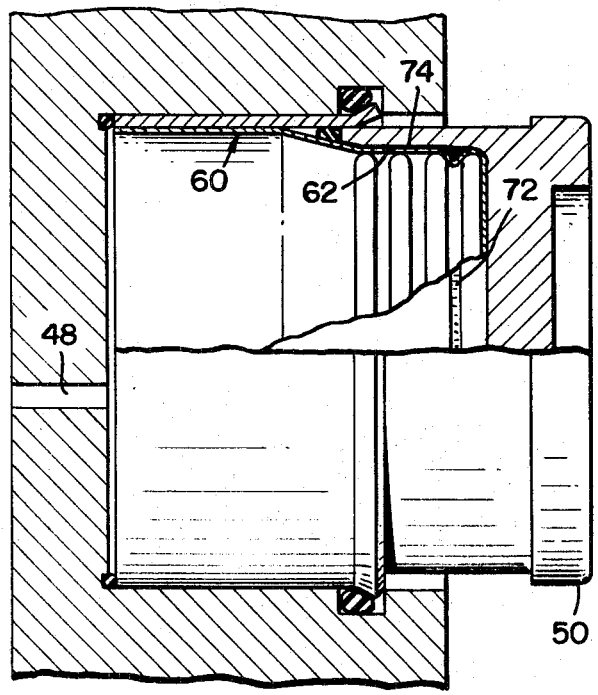
FIG_11
INVENTOR.
TOM H. THOMPSON
BY
ATTORNEYS

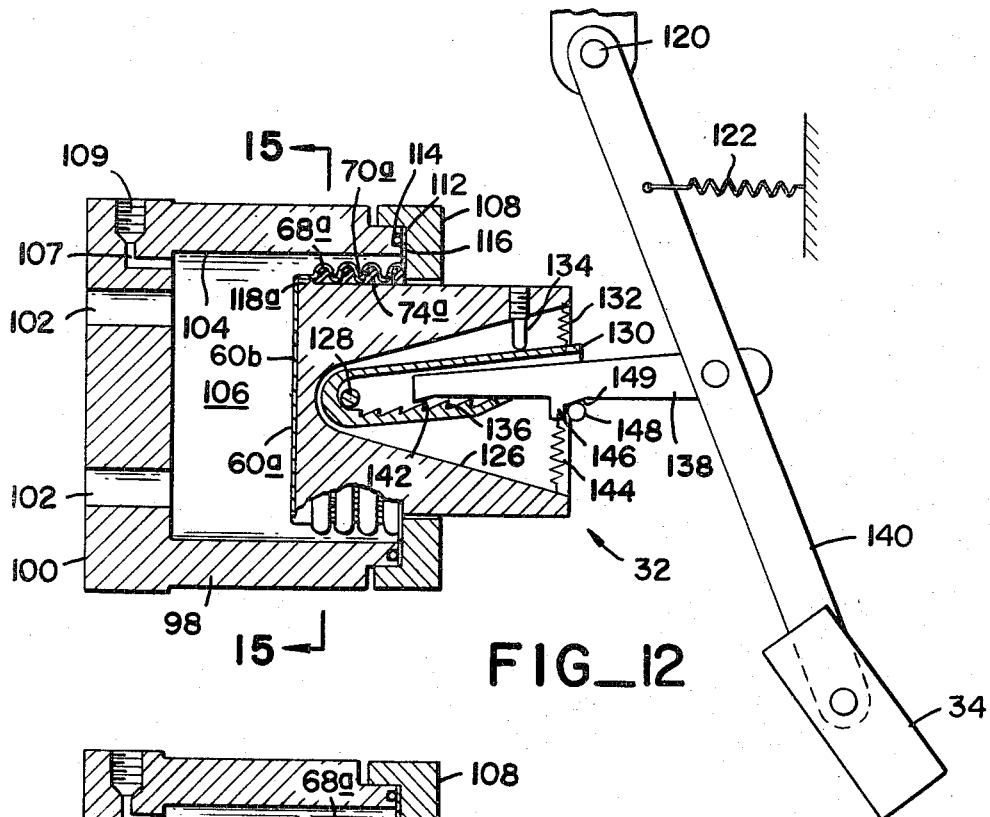
FIG_12
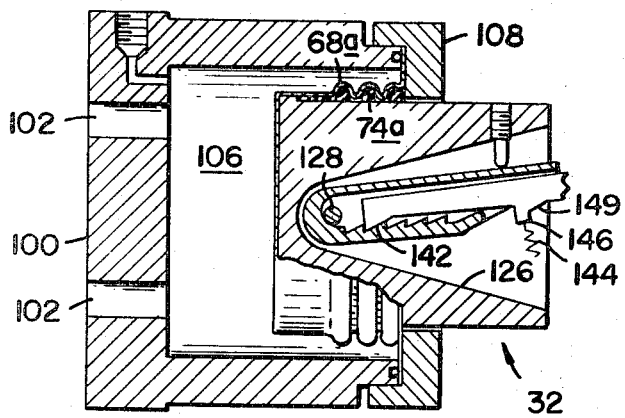
FIG_13
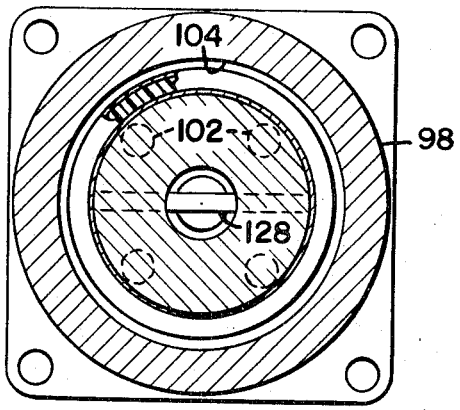
FIG_15
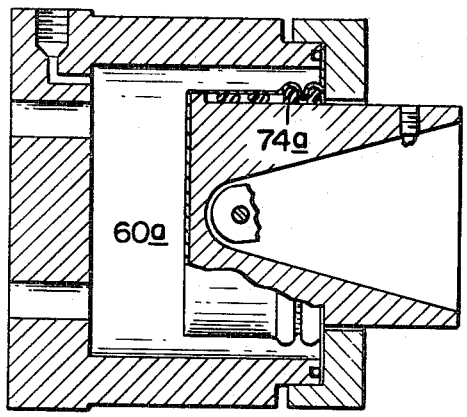
FIG_14
INVENTOR.
TOM H. THOMPSON

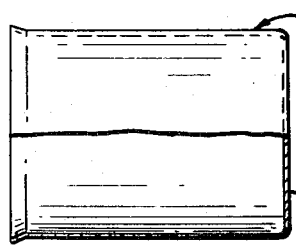
FIG_16
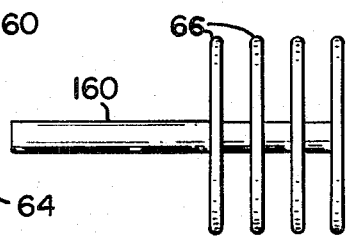
FIG_17
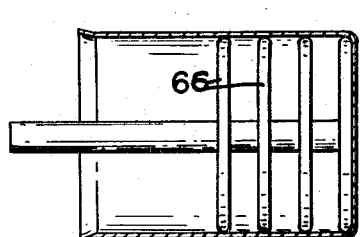
FIG_18
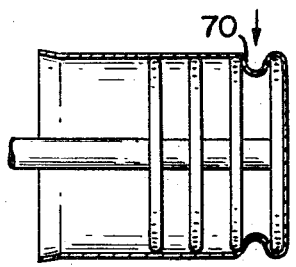
FIG_19
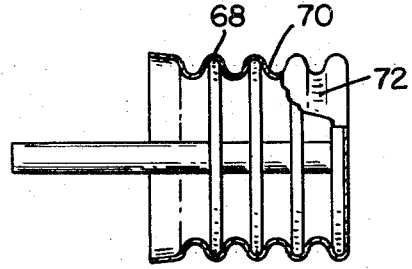
FIG_20
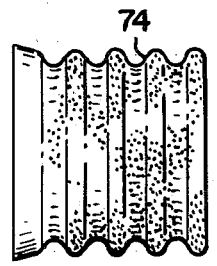
FIG_21
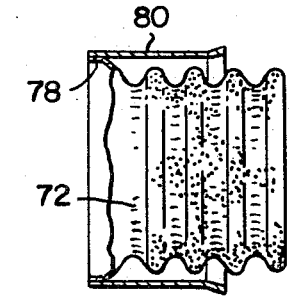
FIG_22
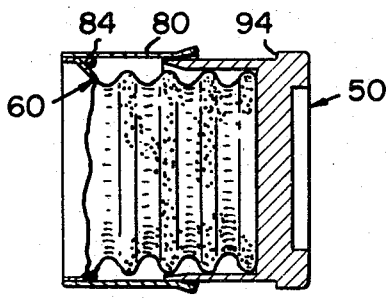
FIG_23
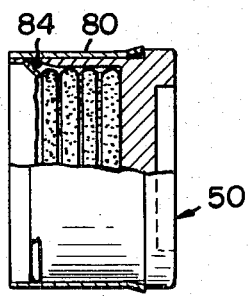
FIG_24
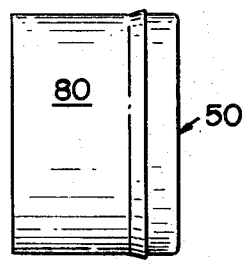
FIG_25
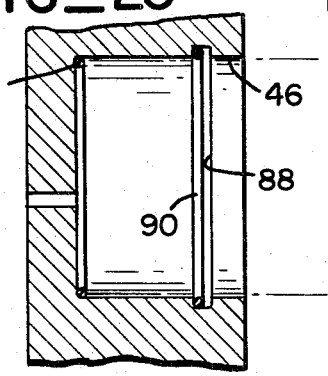
FIG_26
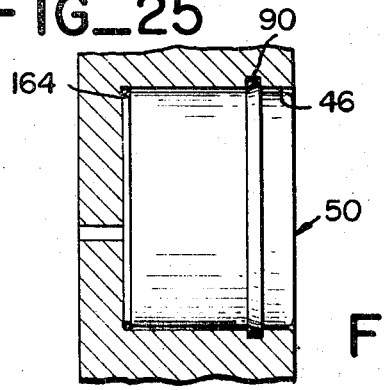
FIG_27

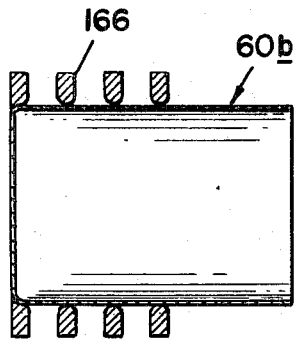
FIG_28
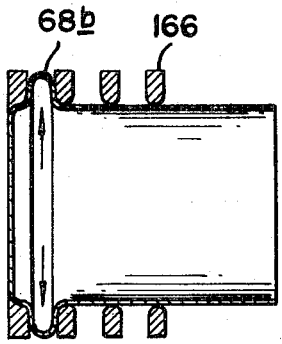
FIG_29
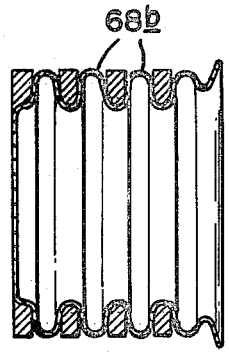
FIG_30
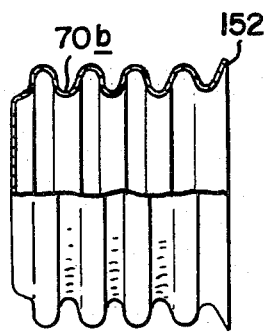
FIG_31
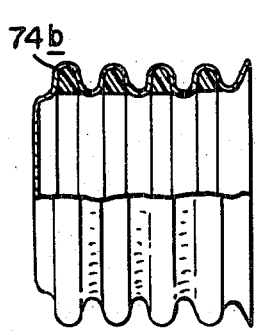
FIG_32
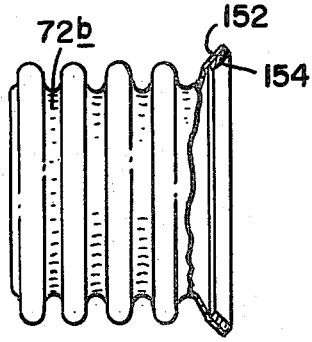
FIG_33
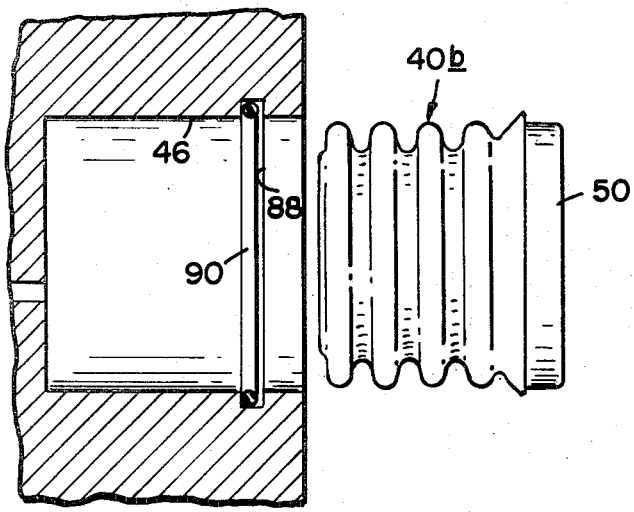
FIG_34
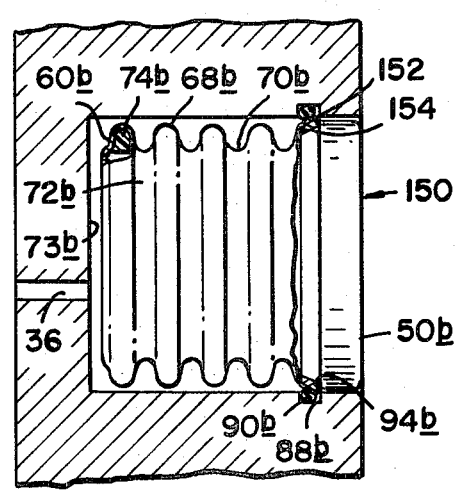
FIG_35
INVENTOR.
TOM H. THOMPSON INVENTOR.
Tom H. Thompson
BY
Barnard, McGlynn & Reising
ATTORNEYS

BRAKE MECHANISM

This invention relates to brake mechanisms for vehicles and more particularly to a closed hydraulic brake system. It also relates to actuator units particularly adaptable for use in such closed brake systems and to a method for making such actuator units.

In conventional brake systems for vehicles heretofore devised, both band-drum and disc-type brakes utilized sliding piston actuators in what are known as "open" hydraulic brake systems. The term, "open," was applied to such brake systems because the sliding piston constantly exposed the brake fluid acting directly on the piston to the atmosphere. In other words, the hydraulic working fluid was not confined by nonmoving parts within the system. Elaborate attempts to seal such sliding pistons for long periods of operation were not successful. This became a particularly severe problem with the advent of power-boosted brake fluid systems which utilized fluid at relatively high pressure. Such "open" systems ultimately leaked, particularly as parts became worn, and the resultant loss of fluid caused decreased brake efficiency. Also, the inherent failure of seals between moving parts allowed friction and corrosion-producing substances to enter the brake mechanism. A further serious problem with "open" systems was that their operation entailed the rubbing or sliding of their pistons which therefore were also subject to sticking or variable friction characteristics that often produced variable braking characteristics at each wheel under different operating conditions, particularly after storage periods. This inherent "slip-stick" factor with the conventional sliding piston actuators not only resulted in excessive wear of brakes but often caused a dangerous imbalance of brake applicating force. It also increased the difficulty of making brake adjustments.

One object of the present invention is to provide a closed brake system that eliminates the aforesaid problems. More particularly, it is an object of my invention to provide a closed brake system that requires no fluid seals between moving parts and which completely eliminates any rubbing or sliding between parts and thus removes any friction factor which could create an imbalance or variable operating characteristics between the actuators of the system.

Although disc-brake mechanisms theoretically afford certain advantages over the band-drum type they are particularly sensitive to the problems of an "open" hydraulic system. For example, a critical factor in disc-brake mechanisms is the necessity of maintaining a minimum clearance between the wheel disc and the brake liner pad controlled by brake actuators. If this clearance is too great, dirt, grime and oil can collect within this space from particles thrown up from the road, and the brakes then will function improperly without sufficient power, or they will tend to apply uneven force and produce uneven wear on each wheel. Each time the brake is applied an actuator must force the brake pad against the brake disc, and when the brake is released, the pad and hence the actuator must retract only enough to eliminate a dragging contact with the wheel disc. Yet, as the brakes are used, wear inevitably takes place, which means that the piston must extend further with each cycle. Thus, a particular problem prior to the present invention was to provide an actuator for a disc-brake system that would extend the piston the distance required during its stroke and yet one which always retracted when the brakes were released, but only enough to provide the minimum clearance desired. Another object of the present invention is to provide a closed hydraulic disc-brake system for vehicles that solves the aforesaid problem.

Another object of the present invention is to provide a closed disc-brake system utilizing actuator units that will increase their stroke to compensate for wear over a long period of use, and yet which will always retract an amount which provides the minimum clearance necessary between the wheel disc and the brake pad which is moved by the actuators.

With these and other objects in view, the present invention contemplates a closed hydraulic brake system in which the brake fluid is completely trapped and in which no sliding piston actuators are used, either for the wheel actuators or the master cylinder. The actuators at each wheel which operate a brake pad are units which receive the brake fluid in a completely sealed space. Each actuator comprises a thin-walled member that is initially deformed in a predetermined manner during its manufacture and supported so that when acted upon by the fluid pressure of the system, it will change shape again to move a piston axially. The vessel is of a material that is plastically formable and thus is flexible without being substantially elastic. Each actuator vessel is deformed from an original shape and in a predetermined manner to have a plurality of folds, convolutions or wrinkles so that when acted upon by external or internal fluid pressure its tendency is to return by increments with each cycle of brake operation to its original shape. Thus, during the large number of cycles of use of each actuator, the actuator vessel may continue to extend in response to fluid pressure when the brakes are applies and to push a piston with the necessary braking force. A small amount of elasticity may be provided by the deformed vessel so that when the fluid pressure is released the vessel and hence its piston will retract only enough to provide the necessary clearance between the brake pad and the wheel disc. Since the piston of each of my actuator units is not in sliding contact within a cylinder, it is not subject to friction and equal braking force will always be applied to all wheels. Also, since the brake piston is not directly acted upon by fluid, it need not be sealed to prevent fluid leakage as it operates. Moreover, it is not necessary that the hydraulic fluid have lubricating properties, which is a strict requirement of conventional open hydraulic systems. Accordingly, another object of the present invention is to provide a closed hydraulic disc-brake system that does not require a piston in sliding contact with a cylinder and thus does not require hydraulic fluid having lubricating properties.

Yet another object of my invention is to provide a closed hydraulic disc-brake system that will provide equal brake force at each wheel regardless of operating conditions and the state of wear of the system.

Another object of the present invention is to provide a closed disc-brake system that will not lose pedal travel over a long period of operation.

Another object of the present invention is to provide a disc-brake system that prevents excessive heat transmission from the brake actuator units to the fluid of the system.

Still another object of the present invention is to provide an actuator for a closed hydraulic brake system comprised of a thin-walled, cup-like member that is initially deformed or collapsed from an original shape in a predetermined manner during its manufacture and when operated is forced progressively back toward its original shape by the actuating pressure of the system during a large number of cycles of operation.

Another object of the present invention is to provide an actuator for a braking system comprised of a thin-walled, cup-like member that is internally supported and yet which is progressively collapsed along its sidewall by deformation of the member material with each brake actuation.

Another object of the present invention is to provide an actuator unit for a closed hydraulic disc-brake system utilizing a thin-walled vessel of a malleable metal that is originally deformed during its manufacture and will expand in a predetermined manner in response to a high fluid pressure of the brake system and will not fracture even after a large number of cycles of use.

Yet another object of the present invention is to provide an actuator unit that is easy to install in a disc-brake system without special tools or the need for highly skilled labor.

Another object of the present invention is to provide an actuator unit for a closed hydraulic disc-brake system that is particularly well adapted for ease and economy of manufacture.

Still another object of the present invention is to provide a method for making an actuator unit that provides all of the aforesaid objects and more particularly a method that can produce such actuator units in large quantity with the necessary precision and quality.

A further object is to provide an actuator particularly suitable for hydraulic disc brake apparatus that can be formed to have a braking surface so shaped to apply a braking force over the maximum area of a wheel-mounted brake disc.

A further object is to provide an actuator for hydraulic brake apparatus formed with a pair of spaced end portions with an endless sidewall extending between the end portions and at least one inelastically deformable corrugation formed in the sidewall that tends to flatten out inelastically when the actuator is forced to extend and increase the space between the end portions, the inelastic deformation of the corrugation preventing the actuator from rebounding elastically to its original length when the extending force is removed so that the relaxed length of the actuator progressively increases with each cycle of extension and relaxation of the actuator to accommodate for wear between braking surfaces.

Still another object is to provide hydraulic disc brake apparatus wherein braking pressure can be applied to a wheel-carried brake disc throughout an annular area coaxial with the axis of rotation of the disc.

Other objects, advantages and features of the present invention will become apparent from the following description taken in connection with the accompanying drawings in which:

FIG. 7 is a schematic view of a closed hydraulic brake system embodying the principles of the present invention;

FIG. 8 is a fragmentary view in section of a typical brake caliper housing for the system of FIG. 7 showing a pair of actuator units according to my invention installed;

FIG. 9 is an enlarged view in section of an actuator unit embodying the principles of my invention after it has been installed in a housing;

FIG. 10 is a view similar to FIG. 9 showing the same actuator unit after it has been partially extended;

FIG. 11 is a view similar to FIGS. 9 and 10 showing the same actuator unit after it has been almost fully extended in use;

FIG. 12 is a view in elevation and in section of a master cylinder unit for the brake system of FIG. 7 according to the present invention;

FIG. 13 is a view in section similar to FIG. 12 showing the piston of the master cylinder partially extended;

FIG. 14 is a view similar to FIG. 13 showing the piston extended further;

FIG. 15 is a view in section taken along line 15—15 of FIG. 12.

FIGS. 16 to 25 are a series of views in elevation and in section showing steps which comprise a method for making an actuator unit according to the principles of my invention;

FIGS. 26 and 27 show steps for installing a completed actuator unit in a housing;

FIGS. 28 to 33 are a series of views in elevation and in section showing a method for making another embodiment of an actuator unit embodying the principles of the present invention;

FIGS. 34 and 35 are views showing the installation of the actuator unit of FIG. 32 in a housing;

A principal feature of the present invention, as illustrated in all embodiments disclosed herein, is that the elastic spring-back or rebound characteristics of an extendable actuator are such that the relaxed length of the actuator progressively increases with each cycle of pressurization and relaxation to compensate for wear of the brake lining material. That is to say, each time the actuator is caused to extend under pressure, some inelastic deformation takes place so that when the extending pressure is removed, the actuator will not spring back or rebound to the original length (i.e., the length before the extending pressure was applied), but will instead rebound only a fraction of the total amount of extension with the result that the actuator has a new relaxed length greater than the relaxed length prior to the application of the extending pressure. Thus, if the actuator has a relaxed length X and then is caused to extend under a pressure a distance Y so that its extended length is equal to X plus Y, the inelastic deformation will be such that when the extending pressure is removed, the actuator will not relax to the original length X, but will instead relax to a length X plus some fraction of Y. This principle is illustrated in FIGS. 1, 1a and 1b through 6, 6a and 6b.

Figure 1:
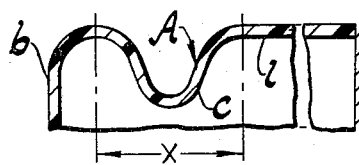
FIGS. 1, 1a and 1b through FIGS. 6, 6a and 6b are fragmentary views illustrating the rebound characteristics of some of the various materials that can be employed in the present invention.
Figure 1A:
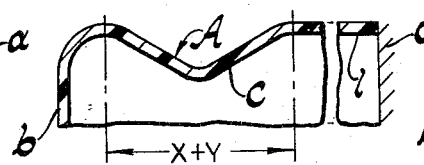
Figure 1B:
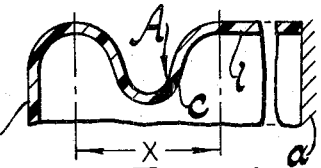

FIGS. 1, 1a and 1b illustrate a fragmentary portion of an actuator A having an endless sidewall 1 extending between a fixed end portion a and a movable end portion b. Formed in the elastomeric side wall 1 is an inwardly projecting corrugation c. The corrugation c is formed in a segment of the sidewall having a length X. When pressure is applied to actuator A to cause the actuator to extend such that the end portion b moves away from the end portion a, the length of the corrugated segment increases from X to X plus Y, as illustrated in FIG. 1a. Since the actuator A is comprised solely of elastomeric material, when the extending pressure is removed, the actuator A relaxes or springs back to the original length with the result that the corrugated segment c returns to its original length X.

Figure 2:
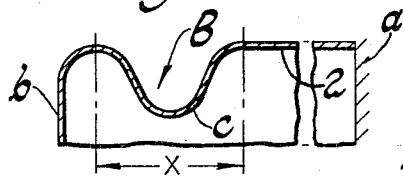
Figure 2A:
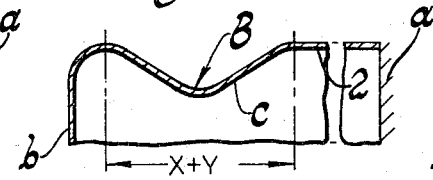
Figure 2B:
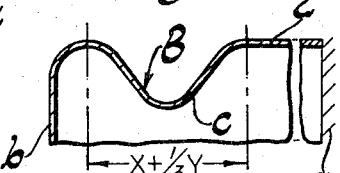

FIGS. 2, 2a and 2b illustrate an actuator B having a sidewall 2 formed of beryllium copper which is, of course, a more ductile or inelastic material than the elastomer of FIG. 1l. The sidewall 2 of actuator B is formed with a corrugated segment having an inwardly projecting, inelastically deformable corrugation c. When the actuator B is pressurized to increase the length of the sidewall 2 and cause the end portion b to separate further from the end portion a, the corrugation c tends to flatten out such that the length of the corrugated section increases from X to X plus Y as shown in FIG. 2a. The extension of actuator B as illustrated in FIG. 2a, causes inelastic deformation of corrugation c such that when the extending pressure is removed from the actuator B, the inelastic deformation of corrugation c prevents the actuator from elastically rebounding to its original length. Instead, as illustrated in FIG. 2b, the actuator B relaxes to a length greater than its original length of FIG. 2 such that the corrugated segment has a length X plus ⅓Y. The inelastic deformation of the corrugation c therefore causes the corrugated segment of the actuator B to rebound or spring back elastically only two-thirds of the amount that it was extended. Consequently, the relaxed length of the corrugated segment of actuator B increases by one-third of the amount that it is extended.

Figure 3:
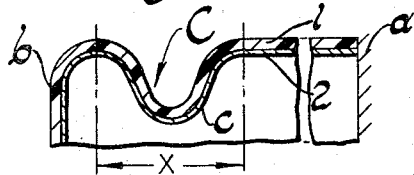
Figure 3A:
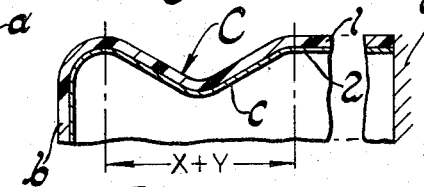
Figure 3B:
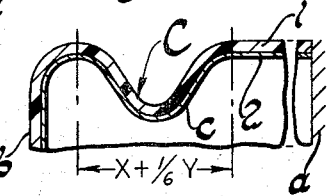

FIG. 3 illustrates a fragmentary portion of an actuator C having a multi-layer sidewall of elastomeric material 1 as in the FIG. 1 embodiment and beryllium copper 2 as in the FIG. 2 embodiment. The elastic characteristics of the combination of the elastomeric material 1 and beryllium copper 2 are such that when the actuator C is subjected to an extending pressure causing the corrugated segment to extend from length X in FIG. 3 to a length X plus Y in FIG. 3a, the corrugated segment will elastically rebound or spring back approximately 5/6 of the extended distance Y to a new relaxed length X plus 1/6 Y when the extending pressure is removed. The relaxed length of the corrugated segment of the actuator C thus increases approximately one-sixth of the amount that it is extended with each cycle of pressurization and relaxation of the actuator C.

Figure 4:
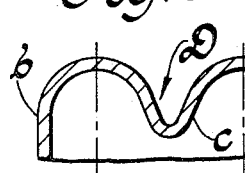
Figure 4A:
Figure 4B:

FIG. 4 illustrates a similar actuator D of lead having a sidewall 3 extending between a fixed end portion a, and a movable end portion b. The sidewall 3 is formed with a corrugated segment having an inwardly projecting corrugation c. As illustrated in FIG. 4, 4a and 4b, when the actuator D is pressurized to cause the corrugated segment to extend from a length X to X plus Y, the corrugation c deforms inelastically such that when the extending pressure is removed, the corrugated segment elastically rebounds only one-sixth of the amount of extension. As a consequence, the relaxed length of the corrugated segment increases from X to X plus 5/6 Y with each cycle of extension and relaxation of the actuator.

Figure 5:
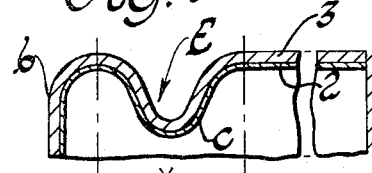
Figure 5A:
Figure 5B:

FIGS. 5, 5a and 5b illustrate an actuator E combining the lead side wall 3 of actuator D with the beryllium copper side wall 2 of the actuator B. When the actuator E is pressurized to cause the corrugated segment to extend from length X to X plus Y, the corrugated segment elastically rebounds only one-third of the extended distance Y when the pressure is removed so that the new relaxed length of the corrugated segment as illustrated in FIG. 5b is X plus ⅔Y, instead of X.

Figure 6:
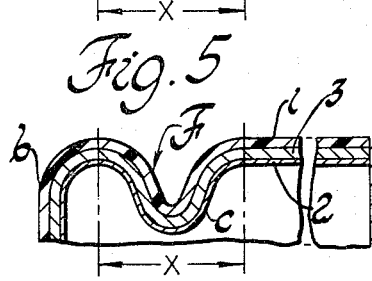
Figure 6A:
Figure 6B:
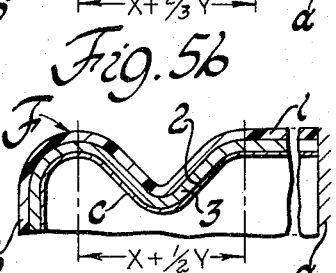

FIGS. 6, 6a and 6b illustrate an actuator F combining the elastic characteristics of actuators A, B, and D. Actuator F is made up of a side wall having an outer elastomeric layer 1, an intermediate layer 3 of lead, and an inner beryllium copper layer 2. When the actuator F is pressurized to cause end portion b to extend from the fixed end portion a, the inelastically deformable corrugation c tends to flatten out and cause the length of the corrugated segment to increase from a length X in FIG. 6 to a length X plus Y as shown in FIG. 6a. When the extending pressure is removed, the combined elastic charac-teristics of the elastomer, lead and beryllium copper are such that the actuator F is prevented from rebounding to the original length, the corrugated segment rebounding elastically only one-half of the distance that it was extended. Consequently, the new relaxed lenth of the corrugated segment is increased from X to X plus ½Y.

Thus, each of the actuators B, C, D, E and F are formed with an endless sidewall extending between end portions a and b with an inelastically deformable corrugation c formed in the side wall that tends to flatten out when the actuator is forced to extend and increase the space between the end portions a and b, the inelastic deformation of corrugation c preventing the actuator from elastically rebounding to its original length when the extending force is removed. By varying the materials and combination of materials, the elastic characteristics of the actuators can be changed to selectively increase or decrease the amount of elastic recovery when the actuator is extended.

Referring to the drawing, FIG. 7 shows somewhat schematically a closed hydraulic brake system 30 embodying the principles of the present invention. Generally, it comprises a master cylinder 32 which may be actuated by a conventional foot pedal 34 through a mechanical linkage or through any suitable power boost system (not shown), to increase and transmit hydraulic pressure to the necessary parts of the system. The master cylinder or main pressure-increasing device is connected by fluid conduits 36 extending to a disc-type brake assembly which is shown at each of the four wheels 38 of a vehicle for illustrative purposes. It is understood that the system could include brake assemblies at only one pair of wheels, if desired. At each wheel the fluid conduit 36 from the master cylinder is connected to one or more actuator units 40 which are installed in a caliper housing 42 that extends around one side of a brake disc 44 attached to the wheel. In the arrangement shown, the caliper housing utilizes four actuator units per wheel. However, it should be understood that any number of such actuator units coule be used if desired, depending on the design of the caliper housing and the desired size and shape of the actuator units.

In accordance with my invention, the hydraulic brake system 30 is "closed" in that both the master cylinder 32 and each brake actuator unit 40 are retained by fixed, fluid-tight seals. In the entire system there are no seals which are adjacent to and therefore required to seal a moving part. Thus, in the illustrated brake system there is no place that leakage of fluid can occur even after long periods of operation, and normally there is no necessity for adding fluid to the system. As will be seen, this "closed" hydraulic system is made possible by axially extensible actuators in the form of collapsible, thin-walled bellows-like members which are important elements in both the master cylinder 32 and the brake actuator units 40.

A typical caliper unit 42 which fits over the brake disc 44 and provides a housing for the brake actuator units is shown in greater detail in FIG. 8. Each actuator unit is retained in a bore 46 of the caliper that is connected to the fluid conduit through a port 48 in the rear face of the bore. A piston 50 for each actuator unit extends just above the open end of the bore, and its end face 52 bears against a brake pad 54 having a layer 56 of brake liner material that in turn engages the wheel disc 44 when the brakes are applied.

The axial movement of the actuator piston 50 when the brake is applied is preferably very small, and when the brake is released, it is necessary that the actuator piston retract by only this relatively small amount to maintain the required minimum clearance (indicated by the numeral 58) between the brake liner 56 and the wheel disc 44 (i.e., preferably no more than 0.006 inch). As the brake lining and the wheel disc wear down during normal use, the actuator piston 50 must keep extending a greater amount in order to reach and apply the proper braking pressure to the brake disc. Yet, the piston must always return only the small amount to provide the aforesaid minimum clearance. How this is accomplished automatically and uniformly by each of the present actuator units 40 in the system 30 will become apparent as a more detailed description of the invention proceeds.

In accordance with the embodiment shown in FIG. 9, each actuator unit 40 is comprised of an actuator in the form of a yieldable, thin-walled, bellows-like member 60 located inside an end cavity 62 of an actuator piston 50. This member is made from a plastically or inelastically deformable material such as a ductile or malleable metal which can withstand a high degree of plastic or inelastic deformation without fracturing or otherwise reaching its failure limit. For example, I have found that a beryllium-copper alloy having a thickness of around 0.003 inch has particularly desirable characteristics. As will be seen later in describing the method aspects of my invention, the bellows-like member is preferably made in a cup-like form with a closed end 64 that bears against the piston within its end cavity. However, the actuator member 60 could also be made from tubular stock with the inside cavity wall of the piston forming a seal with the sidewall of the member 60. Near its closed end 64, the thin sidewall of this cup member 60 is preformed with corrugations or convolutions around a substantially rigid internal reinforcing member 66. In the embodiment shown, this latter member 66 is comprised of a series of semirigid plastic discs 67 having rounded edges which form annular ridge portions for internally supporting similar ridge portions 68 on the sidewall of the member 60 which are separated by folded annular recesses or folds 70. In some instances, I may provide an internal support member having annular ridge portions and indentations that are formed or held together as one integral member. This provides for a somewhat different operative characteristic during use of the actuator. In either case, the ridge portions 68 are smooth, but within the annular recesses 70, the sidewall is bent in numerous places to provide a plurality of substantially axially-extending and randomly spaced apart folds or wrinkles 72 (FIG. 11). These small wrinkles are formed when the cup member is plastically deformed to a predetermined shape during its manufacture and assembly.

When the actuator is initially installed, as shown in FIG. 9, the annular ridge portions 68 are relatively close together due to an axial compression which was applied to the cup member. During each application of the brakes, the pressure of the fluid within the space 73 at the open end of the actuator unit seated within the housing bore is increased by the action of the master cylinder. This pressure increase causes the bellows-like cup member or actuator 60 to increase in length a very slight amount by causing the intermediate recesses 70 and the small wrinkles 72 of the thin-walled material within the recesses 70 to unfold or straighten out to some degree. What occurs is a substantial inelastic redeformation of the cup member towards its original shape. As the actuator unit is used, the plastic disc 67 and ridge portions 68 of the member 60 gradually move apart axially while the wrinkled recessed portions tend to straighten out. If an integral internal support is used, the entire sidewall may move somewhat with respect to it as the ridge portions 68 gradually pull away from the supporting ridges. Surrounding the convolutions or corrugations of the member 60 is a layer 74 of elastomeric material which is confined by the inner sidewall surface of the piston cavity 62 and is thus deformed as the member 60 extends to move the actuator piston 50. When the fluid pressure within the space 73 is reduced as the master cylinder returns to its neutral position, the elastomeric material 74 helps to retract the member by a small amount so that the piston 50 can return and provide the precise, small amount of clearance between the brake pad 56 and the wheel disc 44. As the brake pad and disc wears and the piston must extend to greater distances, as shown in FIGS. 10 and 11, the member 60 continues to provide the necessary increased extension, but it does not create any significant increased retraction force. As long as some ridges and recesses 68 and 70 or folds and wrinkles 72 remain in the cup member, it can be extended axially to some amount and the elastomeric material will always cause a return of substantially the same amount when pressure is reduced within the actuator. Thus, a predetermined amount of brake clearance is maintained throughout the life of the brake system 30 despite the wear condition of the braking surfaces.

As described, the closed end of each thin-walled member 60 is retained within a cavity 62 of the piston 50. Its other open end 78 is fixed to and forms a fluid-tight seal with the inner wall at one end of a rigid sleeve member 80. The inside diameter of this sleeve member is considerably greater than that of the member 60 but provides an easy sliding fit with the piston 50. The piston wall 82 forming its end cavity 72 thus fits between the sleeve member 80 and the member 60. The outer edge of the piston wall forming its inner end cavity 62 may be provided with a slight taper, and between the edge of the piston wall and the thin-walled member, I prefer to provide a resilient packing ring 84 to prevent any sharp bending at this point. At its other end the sleeve member 80 has an outwardly flared or conical flange 86 which is preferably slightly thicker than its wall thickness to give it greater strength and resiliency. This flange serves to retain the entire actuator unit 40 within the housing bore 46 which has a groove 88 spaced inwardly from its open end. A packing ring 90 provided within the groove 88 is deformed into a sealing position by the flange 86 when it is seated within the groove. In essence, the end flange 86 of the sleeve member is resiliently yieldable like a snap ring and enables the actuator unit 40 to be installed merely by simple insertion into the housing bore. Yet, upon this insertion an absolute fluid-tight seal is formed, and the actuator unit cannot be removed without its destruction. To facilitate the installation of the actuator unit in the caliper housing bore, as shown in FIG. 11, the piston 50 has an enlarged outer end portion 92 forming an annular shoulder 94. This shoulder is large enough to engage the sleeve flange 86 so that axial force on the piston will push the sleeve 80 and its attached cup member 60 into the bore 46.

Thus, FIGS. 9, 10 and 11 illustrate hydraulic brake apparatus including an actuator 60 having a pair of spaced end portions 64 and 78 with an endless sidewall extending between the end portions 64 and 78. The sidewall is formed with inelastically deformable corrugations 68, 70 that tend to flatten out when the actuator 60 is forced to extend and increase the space between the end portions 64 and 78. The inelastic deformation of the corrugations 68, 70 prevent the actuator 60 from elastically rebounding to its original length when the extending force is removed.

The side wall of the actuator 60 of FIGS. 9 through 11 comprises a layer of metal (beryllium-copper) and a layer of elastomeric material 74. The elastomeric layer is interposed between the beryllium-copper layer and a radial supporting wall concentric with the side wall of actuator 60 to provide yieldable radial support for the beryllium-copper sidewall. The radial supporting wall includes the sleeve member 80 to which one of the end portions 78 of actuator 60 is secured.

The FIG. 9 apparatus further includes means defining a chamber 73, the sleeve member 80 being secured in chamber 73 by means in the form of groove 88 formed in chamber 73, and the outwardly extending flange 86 formed on sleeve member 80 and resiliently projecting into groove 88 to retain the sleeve member in groove 88. The chamber 73 is open at one end and the end portion 64 forms a pressure-responsive movable wall.

The master cylinder 32, as shown in detail in FIGS. 6 to 9, also utilizes a bellows-like, thin-walled cup member 60a similar to the cup member 60 used in each actuator unit 40. However, in this instance the fluid pressure is exerted on the outside of the cup member 60a rather than on the inside as in the previously described actuator unit embodiment. The master cylinder comprises a housing 98 having an endwall 100 with a plurality of ports 102 to which the conduits 36 are connected and a sidewall 104 which forms a chamber 106 filled with the hydraulic fluid of the system. Fluid is originally supplied to the master cylinder through an inlet passage 107 having a removable plug 109. Threadedly secured to the end of the sidewall is an annular cap 108 which fits around a movable piston 110 while also holding a radial end flange 112 of the cup member 60a against a packing ring 114. The latter is seated in a groove 116 in the end face of the sidewall and thereby provides a fixed fluid-tight seal.

The piston 110 extends through an opening in the cap and into the cup member 60a. It is generally cylindrical and preferably has a head end plate 118 of slightly greater diameter than its main body that bears against the inside end of the cup member 60a. The latter fits over the end plate and has sidewall convolutions comprises of alternating annular ridge portions 68a and recesses 70a. As in the case of the members 60, the recesses 70a have a plurality of axial wrinkles 72 that are circumferentially spaced apart. Between the ridge portions and the piston wall I provide a series of ring-like members of an elastomeric material 74a which help the wrinkles and corrugations of the cup member to straighten out uniformly as the master cylinder is used. The inelastic deformation of the cup member in the master cylinder is essentially the same as that of the similar bellows-like members 60 in each actuator unit. Here the hydraulic fluid within the chamber 106 surrounding the cup member 60a holds it firmly against the piston 110 and the elastomeric ring-members 74a. When the piston is moved axially with each brake actuation cycle to increase the hydraulic pressure, the cup member extends a small amount causing a progressive unfolding of its wrinkles and folds which were originally formed by the predetermined plastic deformation of the cup unit. This plastic deformation of the cup member 60a due to the action of the piston within is shown progressively in FIGS. 6 through 8. In FIG. 8, the ringlike elastomeric members are deformed and lay over or flatten out as the cup member unfolds gradually.

The axial actuation of the master cylinder piston 110 may be accomplished in any suitable means that affords the necessary axial force on the piston. In the arrangement shown in FIG. 6, an automatic take-up linkage is connected to the foot pedal 34 which is pivotally mounted at one end 120 and provided with a return spring 122. The piston has a conical recess 126 with a retaining pin 128 at its inner end to which is loosely connected a hollow receiving link 130. The latter is biased upwardly by a spring 132 fixed to the piston, and its position is controlled by an adjustable stop member 134. Internally, the link has a series of ratchet teeth 136 on its lower side. Extending within the hollow link is another link 138 connected to the pedal lever arm 140. This latter pedal link has a head end with a tapered end portion 142 which can fit within the teeth of the receiving link. A spring 144 attached to a downwardly extending lug 146 on the pedal link urges it downwardly and into engagement with the teeth 136 of the receiving link. A stop member 148 may be attached to any convenient surrounding frame structure to engage the lug 146 and therby control the return of the foot pedal to a limit and to disengage the ratchet teeth by sliding up an incline surface 149 on the link 138.

When the brake pedal 34 is pushed during any normal application of the brakes, the pedal link 138 is biased downwardly and engages the teeth of the 130 receiving link to push the piston 110 into its housing. (See FIG. 7) When the pedal is released, its return spring 122 causes a reversal of the pedal lever and the pedal link moves out of engagement and backwardly until it engages the stop member. With increased wear of the brakes which calls for greater extension of the master cylinder piston, the pedal link provides automatic take-up by engaging teeth 136 that are progressively farther from the pivot pin 128. Thus, the pedal travel will remain the same even though the master cylinder piston continues to extend further with brake wear.

Modern brake systems preferably operate with boosted hydraulic pressure in order to increase efficiency and lessen the effort required by the operator. Although a conventional boost device has not been shown to conserve space, it could easily be installed, if desired, with my master cylinder arrangement by connecting the receiving link 130 and the pedal link 138 to the input link of the booster and the booster output rod directly to the piston 110.

FIGS. 12 through 15 thus disclose hydraulic brake apparatus including an actuator 60a having a pair of spaced end portions 60b and 112 with an endless sidewall extending between the end portions. Inelastically deformable corrugations 68a, 70a are formed in the sidewall and tend to flatten out when the actuator 60a is forced to extend and increase the space between the end portions 60b and 112. Piston 110 defines a radial supporting wall concentric with the sidewall of actuator 60a, and elastomeric material 74a is interposed between the sidewall of actuator 60a and the radial supporting wall defined by the piston 110 to provide yieldable radial support for the corrugations 68a, 70a.

FIGS. 12 through 15 further illustrate a housing 98 having a sidewall surrounding actuator 60a, with end portion 112 of the actuator 60a being secured to the end of the sidewall of the housing. The end portion 112 is in the form of a radial flange which overlies the end of the housing sidewall and is secured in place on the sidewall by the annular cap 108. Groove 116 in the end of the housing sidewall receives a packing ring 114, the radial flange 112 overlying groove 116 to retain the packing ring 114 within the groove.

Using the same general arrangement as the master cylinder, another form of actuator unit designated by the numeral 150 embodying the principles of my invention, is shown in FIG. 35 wherein a bellows-like cup member 60b is subjected to external rather than internal pressure. Such an actuator may be particularly useful in brake systems where it is not critical to prevent any friction between the ridge portions of the cup member and the walls of its housing or brake caliper. In the embodiment shown, a thin-walled cup member 60b similar in plastically deformable material and wrinkled and convoluted from to the members 60 and 60a has a peripheral flange 152 at its open end which is fixed as by soldering to a flared or tapered snap ring 154. Between the open and closed ends of the cup member are a series of convolutions or corrugations including annular ridge portions 68b and intervening recesses 70b with axial wrinkles as in the cup members previously described. A piston 50b having a shoulder 94b at its upper end which originally bears against the snap ring 154 extends into the cup member 60 b. Between each of the ridge portions and the outer wall of the piston is an elastomeric ring 74b of some fairly rigid but deformable material. As with the actuator unit 40 these rings provide support for the thin-walled cup member and also a small return force that causes the cup member to retract when hydraulic pressure is reduced and thereby produce the brake clearance desired. The actuator unit 150 is fully installed when the snap ring 154 is seated in a groove 88b of the brake housing and deforms a suitable packing ring 90b to form a fixed fluid-tight seal. In a typical arrangement similar to the actuator unit 40 previously described, the hydraulic fluid is supplied to the chamber 73b behind the piston through a conduit 36. When installed the cup member is extended with its ridge portions 68b spaced apart and preferably with folds and wrinkles 72b partially formed in the recesses 70b between ridges. When brakes are applied and pressure is increased within the chamber 73b the cup member will plastically deform slightly and force the piston axially. As this occurs the ridge portions are forced closer together and the cup member 60b is caused to collapse in a controlled manner so that when pressure is reduced in the brake chamber very little springback takes place in the cup member and most of it is caused by the elastomeric rings 74b.

Further details of construction of my actuator unit 40 according to my invention can best be understood by describing a method of making it, as shown in FIGS. 16 to 24. As mentioned previously, the cup member 40 is made of a relatively thin material that is ductile and malleable and thus durable even when deformed in a large number of folds or wrinkles. Each of these cup members is first formed by a deep drawing technique as a smooth vessel having a closed end. (See FIG. 16) While various materials may be used, as stated previously, a metal such as a beryllium-copper alloy is preferred which is deep drawn to a uniform wall thickness of around 0.003inches and then annealed after drawing. This bellows-like cup member 60 thus has a closed end portion 64 at one end, and at its other end, it is open.

In the next step of my method a series of disc-like support members 67 are utilized to form the annular ridge portions 68 and the intervening recesses 70. To accomplish this the support members 67 are installed temporarily on a mandrel 160. The latter members have smoothly curved edges and may be made from a suitable semirigid plastic material, such as nylon, which is relatively hard but not brittle so that they will maintain their shape when the material of the cup is formed around them. As shown in FIG. 17, these disc-like members are threaded to the mandrel 160 and spaced apart on it a predetermined amount which is approximately twice their thickness.

The mandrel with the disc members in place is now inserted into the cup 60, as shown in FIG. 18, with the disc member at the extreme end of the mandrel bearing flush against the bottom of the cup. When a desired number of discs (e.g., 4) are used, they fill only approximately one-half of the depth of the cup.

A radially compressive forming force is now applied circumferentially to the outside of the cup, as shown in FIG. 19 between each adjacent pair of discs to form the circumferential grooves or recesses 70 between them. This compressive forming force may be applied by various means, such as by a flexible band which is applied as the cup is rotated on its axis. In these recesses 70, smaller wrinkles or folds 72 are also formed to provide the necessary contraction in the cup without entailing high stresses. Preferably, this radially-deforming force should be applied to only one annular space between disc members at a time so that no stretching of the cup material occurs as each circumferential recess is formed. Normally, they are formed progressively from the bottom end of the cup toward its open end.

After the annular recesses have been formed between the disc members 67, the latter are now held in place axially within the cup, and the mandrel 160 can be removed. (See FIG. 21) The corrugations of the bellows-like members formed by the alternating ridges and grooves are now sprayed with a layer 74 of plasticized elastomeric material such as natural rubber or neoprene. The thickness of this elastomeric layer is also exaggerated in FIG. 21, and although it may be small (e.g., 0.006 inches) it may vary for actuator units of different sizes. This material provides a force which retracts the cup member a slight amount after each brake application to provide for brake clearance. It also provides external wall support for the thin wall of the convoluted cup even on boosted systems where the hydraulic pressure within the cup may be as much as 2,000 psi.

The next step in the method for making my actuator unit (FIG. 22) is to attach the upper open end of the member 60 to a snap ring sleeve member 80. This may be done by merely soldering its outer flange portion 78 to the inner wall of the sleeve member, after which operation any excess cup material may be trimmed from the end of the sleeve.

This combination of the cup and the sleeve is now ready for insertion into the cavity 62 of a piston 50. (See FIG. 23) Before this insertion the relatively hard sealing ring 84 is placed on the edge of the piston wall to provide a stress-reducing, protective ring between the upper end of the cup member and the inner sleeve wall. Preferably, the outside face end of the cup end portion 64 is bonded to the inside transverse surface of the piston by a suitable material, such as an epoxy adhesive, although this step is not essential.

In the next step of my method, the entire actuator assembly which now includes the convoluted cup member 60 attached to both the sleeve member 80 and the piston 50 is compressed axially a predetermined amount. This amount is precisely set by the shoulder 94 of the piston when it meets the flared flange 86 of the snap sleeve 80. During this compression additional deformation of the cup member takes place as its annular ridge portions 68 are forced closer together, and the intervening annular indentations 70 are caused to wrinkle to a greater degree.

At this point, a suitable thermosetting plastic material may be poured through the open end of the cup member 60 to fill in the central holes of and the small spaced between the disc members 67. This essentially forms an integral internal support 66 for the cup member which is particularly useful for some applications of my invention. In any event, this plastic material is preferably not filled up above the top disc.

The completed actuator unit 40 (FIG. 25) is now ready for insertion in an actuator unit housing, and this is accomplished as seen in FIG. 26, by merely tapping on the face of the piston 50 to push the unit into place. The shoulder 94 of the piston head bears on the sleeve flange 86 during this operation. When so installed, as shown in FIG. 27, the snap ring flange 86 of the sleeve 80 fits into the groove 88 and the packing ring 90 permanently seals the unit 40 in place. To provide even greater sealing reliability, another packing ring 164 is placed around the inside bottom surface of the housing bore 46. This is engaged and deformed by the end edge of the sleeve 80 when the unit is properly in place. The end face of the piston 50 now is substantially flush with the end of the housing bore, and when the system is actuated the piston will move only a slight amount to apply a braking force on the brake disc.

The method for making an actuator unit 150 which is operative by external pressure is similar to the method just described and is described by the FIGS. 29 through 33. A cup member 60b of formable material is first provided in the same manner as the cup 60.

As shown in FIG. 28, a series of split-forming bands 166, which may be provided in two sections, are placed around the cup at predetermined spaced apart intervals. Preferably, the space between bands is approximately double their thickness. One band is located axially near the bottom of the cup with the rest being spaced apart axially toward its open end.

In the next step of the method (FIG. 29), radially outwardly directed force is applied circumferentially in the annular space between the first and second rings, thereby forming an annular ridge 68b between them. Since the open end of the ductile, malleable cup is unrestrained, it is shortened in length and no stretching or thinning of the metal occurs at the ridge portion. The forming rings 166 may be provided with circumferentially spaced apart ridges on their inner surfaces which help to form wrinkles or folds in the indentations of the cup. As with the cup member 60, these smaller wrinkles help it to collapse uniformly with its important no-springback characteristic when subjected to an axial force. After the first ridge portion is formed by an internal radially directed force, the other ridge portions are formed progressively in the same manner between pairs of outer rings toward the open end of the cup.

When all of the desired number of ridge portions have been formed in the cup member 60b, the forming bands 166 are removed. In the next step of the method, an elastomeric material 74b is supplied to the inner surface of the cup so as to substantially fill and form ring-like portions inside of the ridge portions 68b.

When the cup 60b is to be used for an actuator unit 40b, a snap ring 154 is attached as by soldering to the outer flange 152 of the cup member. As shown in FIG. 34, the piston 50b is now inserted into the cup and its shoulder 94b is caused to bear against the snap ring 154 and force it into the locking groove 88b which has a packing ring 90b.

When a cup member 60b is used as a master cylinder actuator, as in FIG. 6, the piston 110 is first inserted into the convoluted cup member and the latter is then collapsed axially around it so that its ridge portions are pushed close together. As this occurs, smaller wrinkles and folds occur within the indentations. As the master cylinder is used and gradually extends with each cycle, the ridge portions spread progressively farther apart and the wrinkles and folds all move toward the originally smooth, unwrinkled position.

Figure 36:
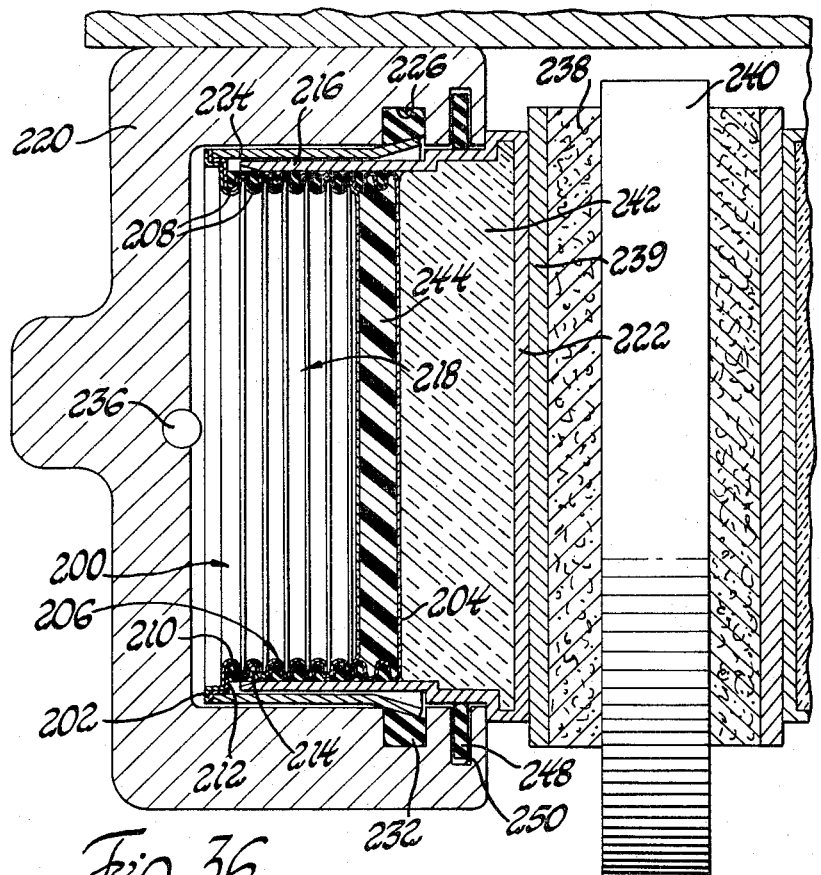
FIG. 36 is a sectional view of hydraulic brake apparatus embodying the invention in another form with the actuator retracted.
Figure 37:
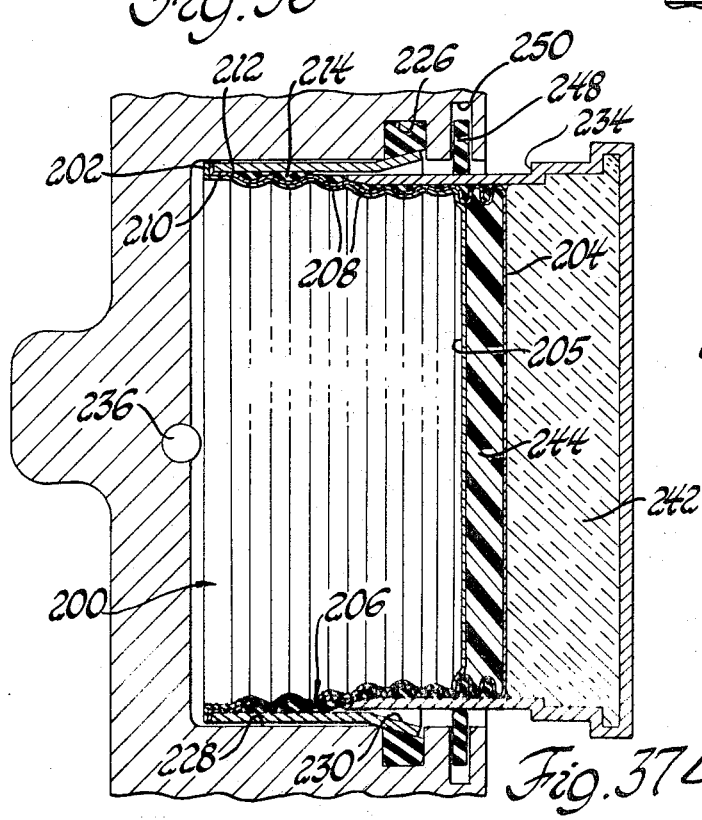
FIG. 37 is a view of the apparatus of FIG. 36 with the actuator extended.

FIGS. 36 and 37 disclose the invention embodied in hydraulic apparatus comprising an actuator 200 having a pair of spaced end portions 202 and 204 with an endless sidewall 206 extending between the end portions 202 and 204. Inelastically deformable corrugations 208 are formed in the sidewall 206 that tend to flatten out when the actuator 200 is forced to extend and increase the space between the end portions 202 and 204 as shown in FIG. 37. The inelastic deformation of the corrugations 208 prevents the actuator 200 from elastically rebounding to its original length when the extending force is removed. The sidewall 206 of the actuator 200 of FIGS. 36 and 37 includes two metal layers 210 and 212 having different elastic characteristics. The outer metallic layer 212 is beryllium-copper and the inner layer 210 is lead. An outer layer of elastomer 214 is applied to the beryllium-copper layer 212.

As in the previously-described embodiments, the hydraulic apparatus of FIGS. 36 and 37 includes means defining a radial supporting wall concentric with the sidewall 206 of actuator 200, the elastomeric material 214 being interposed between sidewall 206 and the radial supporting wall to provide yieldable radial support for the corrugations of the sidewall 206.

The end portion 202 of the actuator 200 is secured to one end of a sleeve member 224 which is received in the open-ended chamber of a caliper unit 220. Groove 226 is formed in the chamber for receiving the outwardly extending flange 230 formed on the end of the sleeve member opposite end portion 202. As in the previously-described embodiment, a packing ring 232 is received in the groove 226 which is deformed into sealing position by flange 230. The chamber defined in the caliper housing 220 open at one end, and the end portion 204 of actuator 200 is closed to form a pressure responsive movable wall. A port 236 is formed in the closed end of the chamber for connection in a hydraulic brake circuit.

A piston 222 is reciprocable in the chamber and is engaged with the end portion 204 of actuator 200. Piston 222 is formed with an end cavity surrounded by a skirt 216 concentric with the sidewall 208 of actuator 200, and at least a portion of the actuator 200 extends into the end cavity defined by skirt 216. As shown in FIG. 36, in the retracted or collapsed position of actuator 200, the skirt 216 is received between the actuator sidewall 208 and sleeve member 224. Thus, a radial supporting wall is defined by skirt 216 when the actuator 200 is in the position shown in FIG. 36, and the sleeve 224 provides a radial supporting wall as the actuator extends to gradually withdraw skirt 216 from between portions of sidewall 208 and sleeve 224.

Heat insulating material 242 such as asbestos is interposed between end portion 204 of the actuator 200 and the end of piston 222. The piston 222 is formed with enlarged outer end portion forming an annular shoulder 234 engageable with the outwardly extending flange 230 of sleeve 234 to facilitate installation of the sleeve 224 in chamber 228 in the manner described with respect to the embodiment of FIGS. 9 - 11.

The end portion 204 of actuator 200 includes an outer metallic layer, an intermediate elastomer layer 244, and an inner metallic layer. The outer metallic layer is a continuation of the beryllium-copper sidewall portion and the inner metallic layer is a continuation of the lead sidewall layer.

FIG. 36 further illustrates a brake pad 239 carried by the piston 222 with a layer of brake lining material 238. The brake lining material 238 is engageable with a surface of a wheel supported brake disc 240. Thus, upon pressurization of the actuator 200 to cause end portion 204 to move away from end portion 202, the brake lining material 238 presses against the face of the brake disc 204 to provide braking friction opposing rotation of the brake disc 204 relative to the caliper housing 220. As the brake lining material 238 wears, the relaxed length of the actuator 200 continues to increase with each cycle of pressurization and relaxation of the actuator as the actuator gradually extends toward the configuration such as is illustrated in FIG. 37. Thus, each time the actuator 200 is extended under pressure to apply braking force between the brake lining material 238 and the surface of brake disc 240, the convolutions or corrugations 208 of the actuator sidewall 206 tend to flatten out inelastically so that the end portion 204 rebounds only a fraction of the amount of travel caused by the pressurization, or brake application.

When the brake lining material is completely worn, and the actuator 200 is in the extended position illustrated in FIG. 37, it can again be forced back into the collapsed condition of FIG. 36 when a new brake lining is installed simply by forcing the piston 22 back into the chamber. Sufficient internal hydraulic pressure can be applied to prevent internal collapsing of the sidewall 206, and the elastomeric layer 214 prevents collapse of the corrugations as the actuator is returned to its original relaxed length of FIG. 36. Thus, a minimum amount of space is provided between the brake lining material 238 and the surface of the disc brake 240 when the actuator is not under pressure.

The chamber 238 is maintained sealed both by the packing ring 232 and by a sealing ring 248 received in a groove 250 formed in the sidewall of chamber 228 adjacent the open end thereof. The sealing ring 248 engages the stepped wall of piston 222 to prevent the entry of dirt, dust and other foreign matter into the space between the piston 222 and the sleeve 224.

Figure 38:
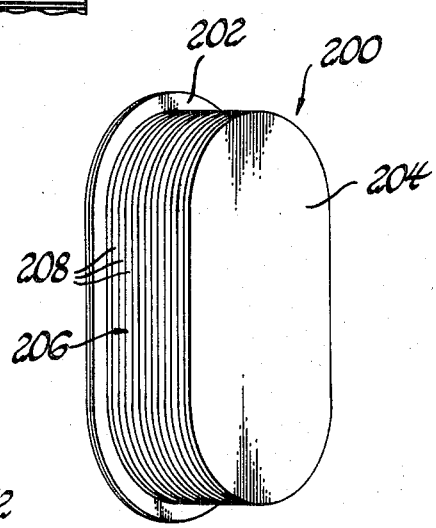
FIG. 38 is a perspective view of an actuator according to the invention.

The corrugated actuators for the brake apparatus of the present invention may be of non-circular configuration so as to apply a braking pressure over a greater surface of the wheel supported brake disc than would be possible with a circular actuator. For example, as shown in FIG. 38, the actuator 200 may be of oval or oblong shape. The beryllium-copper may be formed from a flat sheet into the cup-shaped configuration, and the corrugations 208 can be formed in the sidewall 206 by hydraulic pressure. The elastomer layer may be applied to any desired thickness so that when the actuator 200 is installed and forced to the contracted position of FIG. 36, the elastomer layer 214 will prevent the corrugations 208 from collapsing or fracturing. Other shapes are also possible with an actuator according to the present invention so that the maximum braking pressure can be uniformly applied to the wheel supported brake disc over a large area to thereby increase the efficiency of the brakes.

Figure 39:
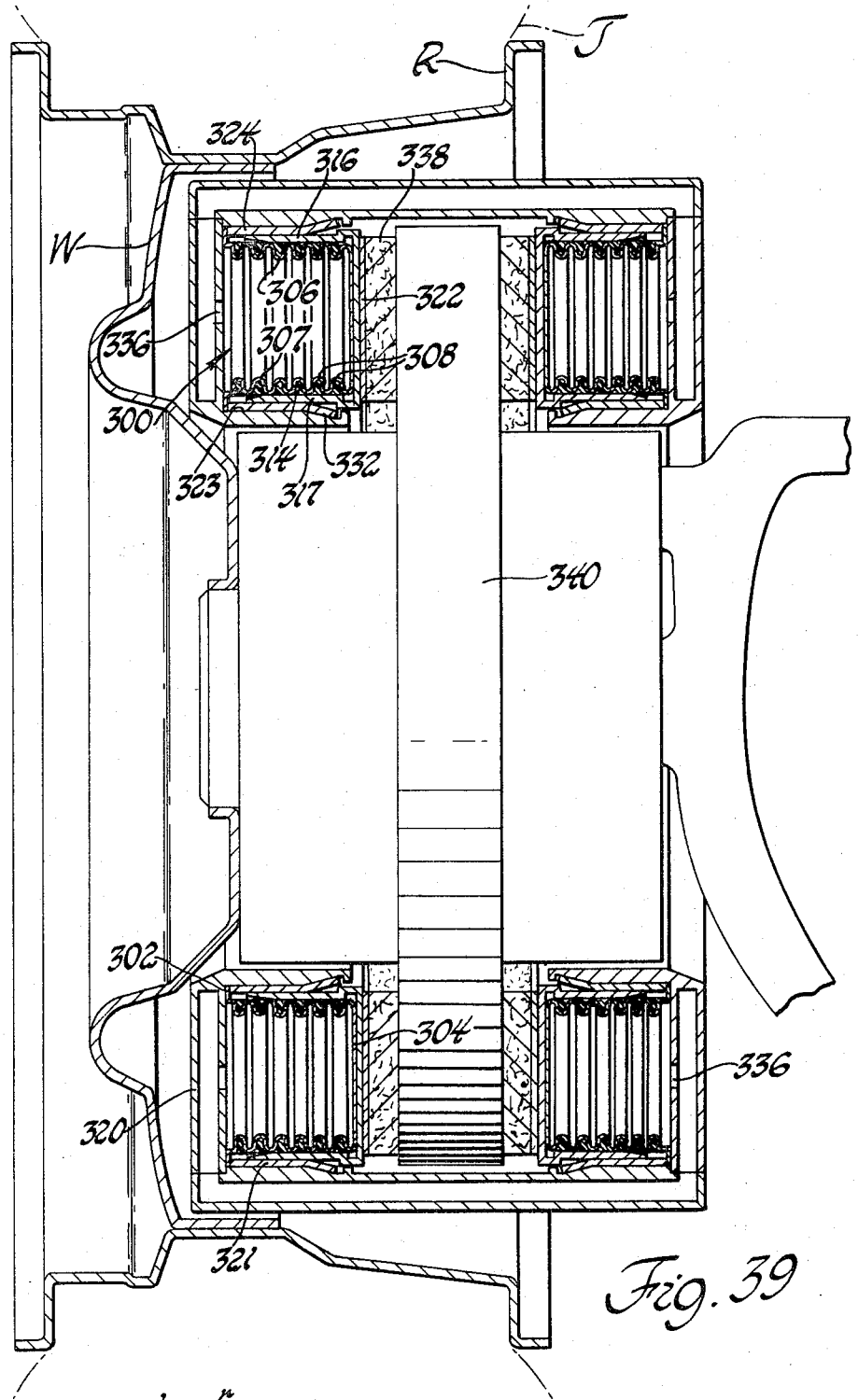
FIG. 39 is a sectional view of a disc brake assembly according to another form of the invention.

FIG. 39 discloses a brake disc assembly for a wheel W having a rim R on which is mounted a tire T. In the FIG. 39 arrangement, the braking pressure is applied over an annular surface coaxial with the axis of rotation of the wheel supported brake disc 340. FIG. 39 discloses hydraulic brake apparatus comprising an actuator 300 having a pair of spaced end portions 302 and 304 with endless sidewall means extending between the end portions 302 and 304. The endless sidewall means in the embodiment of FIG. 39 includes an outer sidewall 306 and an inner sidewall 307 spaced radially inwardly from the outer sidewall 306. Inelastically deformable corrugations are formed in the sidewalls 306 and 307 that tend to flatten out when the actuator is forced to extend and thus increase the space between the end portions 302 and 304.

As in the previously-described embodiments, the inelastic deformation of corrugations 308 prevents the end portion 304 from elastically rebounding to its original position such that the relaxed length of the actuator 300 tends to progressively increase with each cycle of pressurization and relaxation of the actuator 300. That is to say, the elastic deformation of the corrugations prevents the actuator sidewalls 306 and 307 extending between the movable end portion 304 and the fixed end portion 302 from returning to their original length when the extending force or pressurization is removed.

Each of the sidewalls 306 and 307 in the embodiment of FIG. 39 includes a layer of metal and a layer of elastomeric material 314. A radial supporting wall is provided for each of the sidewalls 306 and 307, the elastomeric material 314 being interposed between the respective sidewalls 306 and 307 and the radial supporting wall. The radial supporting wall for sidewall 306 is in the form of an outer piston skirt member 316 and an outer sleeve member 324 while the radial supporting wall for sidewall 307 is provided by the inner piston skirt 317 and cooperating inner sleeve 323. The actuator 300 is pressurized through a port 336 in the end wall of chamber 321. In the embodiment of FIG. 39, the actuator 300, chamber 321, piston 322, and brake pad 338 are annular and are coaxial with the axis of rotation of the wheel W having a rim R and a tire T. Carried by the wheel W is a brake disc 340 which is rotatable with respect to the housing 320.

Thus, the FIG. 39 embodiment discloses a disc brake assembly comprising an annular housing 320 with an open-ended annular chamber 321 formed therein. An annular actuator 300 is mounted in chamber 321 with an open end portion 302 and a closed end portion 304 with extendable sidewall means 306, 307 extending between the end portions 302 and 304. Inelastically deformable corrugations 308 are formed in the sidewall means operable to flatten out inelastically as the actuator 300 is extended under pressure to thereby prevent the actuator from elastically rebounding to its original length when the pressure is removed. The open end portion 302 of the actuator is secured to chamber 321 adjacent the end of the chamber opposite the open end so that the closed end portion 304 forms a movable wall for chamber 321. Means 316, 317, 323 and 324 define a radial supporting wall in chamber 321 concentric with the actuator sidewall means 306, 307 and elastomeric material 314 is interposed between the sidewall 306, 307 and the radial supporting wall 316, 317, 323 and 324 to provide yieldable radial support for the sidewall means 306, 307. A brake liner pad 338 is carried by the enclosed end portion 304 and projects from the open end of chamber 321 such that the pad is reciprocable along the axis of the chamber 321 with the closed end portion in response to extension and retraction of the actuator 300. The brake pad engages a face of the wheel-mounted brake disc 340 upon pressurization of actuator 300 causing the actuator to extend. Thus, uniform braking pressure may be applied over an annular surface of the disc brake 340 on each face thereof.

Figure 40:
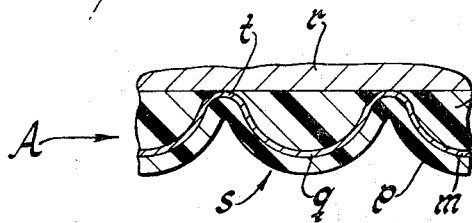
FIG. 40 is a fragmentary sectional detail of an actuator according to the invention.

FIG. 40 illustrates a typical detail of a brake apparatus according to the present invention including an actuator A having an extendable sidewall s adjacent a radial supporting wall r. The sidewall s includes a metal layer m formed with inelastically deformable corrugations, a layer o of elastomeric material between the layer m and the radial supporting wall r, and a layer p of elastomeric material on the opposite surface of the layer m. Hydraulic pressure is directed against the layer p and the layer o reacts to the hydraulic pressure against the radial supporting wall r. When the actuator A is installed in a caliper housing, and forced to a retracted condition, the thickness of the layer o determines the curvature of the inwardly projecting portions q of the corrugations of the sidewall s, and the thickness of the elastomeric layer p determines the curvature of the outwardly projecting portions t of the corrugations. The elastomer on both sides of the layer m prevents sharp peaks from occurring in the corrugations of the metal layer m that would cause fatigue and rupture during operation of the actuator.

While several specific forms of the invention have been illustrated and described in the foregoing specification and accompanying drawings, it should be understood that the invention is not limited to the exact construction shown, but that various alternatives in the construction and arrangement of parts will be apparent to those skilled in the art without departing from the scope and spirit of the invention.

The embodiments of the invention in which an exclusive property or privilege is claimed are defined as follows:

1. Hydraulic brake apparatus comprising: a housing having a cavity formed therein with a closed end and an open end; a port in said closed end for connection with a source of fluid pressure; a fluid pressure transmitting member mounted in said cavity and forming with said cavity a fluid pressure chamber, said fluid pressure transmitting member comprising a metallic cup-like actuator having an open end portion and a closed end portion spaced from and movable with respect to each other; said actuator having mounting flange means secured to the open end portion thereof; means defining a mounting groove in said housing receiving said mounting flange means; static, resilient sealing means between the surfaces of said mounting groove and said mounting flange; said flange means compressing said sealing means between the surfaces of said mounting flange means and mounting groove to form a static, fluidtight seal between the actuator and the closed end of the cavity such that the open end portion of the metallic actuator is secured to the cavity in fixed, fluid tight relationship with respect to the closed end of the cavity and the closed end portion of the metallic actuator defines a fluid pressure responsive movable wall for said chamber and is operable to apply braking pressure when fluid pressure is applied to said chamber from said source; said open and closed end portions of said metallic actuator being spaced from each other by an endless side wall extending therebetween; said side wall being formed with a deformable corrugated metallic segment for changing the length of the side wall and hence the spacing between said open and closed end portions, said corrugated segment being plastically deformable in response to the application of fluid pressure to said chamber to prevent the side wall from returning to its original length when the fluid pressure is subsequently relaxed so that the relaxed length of the metallic actuator changes progressively with the successive application and relaxation of fluid pressure to said chamber; said metallic actuator being statically sealed only to said housing and being free of any sliding sealing relationship therewith.

2. Hydraulic brake apparatus as claimed in claim 1, wherein said mounting flange means comprises a separate mounting member attached to the open end portion of said actuator.

3. Hydraulic brake apparatus as claimed in claim 1 wherein said sidewall further includes a layer of elastomeric material.

4. Hydraulic brake apparatus as claimed in claim 1 further including means defining a radial supporting wall concentric with said sidewall, and elastomeric material interposed between said sidewall and said radial supporting wall providing yieldable radial support for said sidewall.

5. Apparatus as claimed in claim 4 wherein said means secured to said open end portion includes a sleeve member.

6. Hydraulic brake apparatus as claimed in claim 5 wherein said groove is adjacent to and spaced inwardly from the open end of said cavity, said one end of said sleeve member being located on the opposite side of said groove from said open end.

7. Hydraulic brake apparatus as claimed in claim 6 further including a piston reciprocable in said cavity and engaged with said closed end portion of said actuator.

8. Hydraulic brake apparatus as claimed in claim 7 wherein said piston is formed with an end cavity surrounded by a skirt concentric with said sidewall, and at least a portion of said actuator extends into said end cavity.

9. Hydraulic brake apparatus as claimed in claim 8 wherein said skirt is received between the actuator sidewall and said sleeve member.

10. Hydraulic brake apparatus as claimed in claim 9 wherein said piston has an enlarged outer end portion forming an annular shoulder engageable with said flange means to facilitate installation of said sleeve in said chamber.

11. Hydraulic brake apparatus as claimed in claim 10 wherein the sidewall of said actuator is formed with a plurality of corrugations, and further including a series of semirigid plastic discs received in said actuator having rounded edges forming annular ridge portions for internally supporting similar ridge portions of the corrugations of said actuator.

12. Hydraulic brake apparatus as claimed in claim 1 wherein the sidewall of said actuator is formed with a plurality of corrugations, and further including a series of semirigid discs received in said actuator having rounded edges forming annular ridge portions for internally supporting similar ridge portions of said corrugations.

13. Hydraulic brake apparatus as claimed in claim 1 wherein said sidewall is circular.

14. An actuator unit adapted for installation in a bore having a front opening, a continuous sidewall having a groove spaced inwardly from said opening with a packing ring in said groove, and port means in said bore connectable to a source of fluid pressure, said unit comprising: a bellows-like cup member of plastically yieldable material with a convoluted sidewall having a series of annular ridge portions separated by indentations including a plurality of randomly spaced apart and substantially axially extending wrinkles within said indentations, and a flat transverse endwall integral with said sidewall; disc means having rounded edges for internally supporting said ridge portions of said cup member; a sleeve fixed to said cup member at one end and having an outwardly extending flange at its other end projecting into said groove; a piston having a bearing face at one end and a cavity at its other end forming a wall positioned between said cup member and said sleeve; and a layer of elastomeric material between the inner surface of said piston wall and said convolutions of said cup member, whereby fluid pressure supplied to said bore through said port causes said sidewall of said cup member to plastically deform and move said piston axially and said elastomeric material causes a predetermined amount of cup member return when said fluid pressure is reduced.

15. The actuator unit of claim 14 wherein said piston has a head portion with a diameter substantially equal to that of said sleeve flange and a body portion of a reduced diameter thereby forming a shoulder which engages said sleeve flange during the installation of said actuator unit in a bore.

16. An actuator unit adapted for installation in groove, bore having a front opening, a continuous sidewall having a groove spaced inwardly from said opening with a packing ring in said groove, and port means in said bore connectable to a source of fluid pressure, said unit comprising: a bellows-like cup member of plastically yieldable material with a convoluted sidewall having a series of annular ridge portions separated by indentations including a plurality of randomly spaced apart and substantially axially extending wrinkles, and a flat transverse endwall integral with said sidewall; an annular snap ring fixed to said cup member at its open end and seated within said groove thereby retaining and sealing said unit within said bore; a piston bearing against said end wall, said piston having an outer bearing face at its head end and an extended cylindrical portion at its other end being in concentric, telescopic relationship with said cup member and bearing against its endwall; and a layer of elastomeric material between the inner surface of said extended piston portion and said convolutions of said cup member, whereby fluid pressure supplied to said bore through said port causes said sidewall of said cup member to plastically deform and move said piston axially while said elastomeric material causes a predetermined small amount of cup member return when said fluid pressure is reduced.

* * * * *